(12) United States Patent
Arenella et al.

(10) Patent No.: US 7,215,863 B1
(45) Date of Patent: May 8, 2007

(54) LIGHT PIPE OPTICAL COUPLING UTILIZING CONVEX-SHAPED LIGHT PIPE END

(75) Inventors: Kenneth Arenella, Wappingers Falls, NY (US); Dennis R. Barringer, Wallkill, NY (US); Casimer M. DeCusatis, Poughkeepsie, NY (US); Kevin R. Qualters, LaGrangeville, NY (US); Kenneth A. Shadoff, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/412,765

(22) Filed: Apr. 27, 2006

(51) Int. Cl.
  *G02B 6/00* (2006.01)
(52) U.S. Cl. ...................... 385/133; 385/146
(58) Field of Classification Search ............... 385/133, 385/146
  See application file for complete search history.

(56) References Cited

U.S. PATENT DOCUMENTS

| | | | |
|---|---|---|---|
| 5,841,921 A | 11/1998 | Wallace | 385/46 |
| 6,042,241 A * | 3/2000 | Lengyel | 362/84 |
| 6,264,376 B1 | 7/2001 | Savage, Jr. | 385/88 |
| 6,671,432 B2 | 12/2003 | Imada et al. | 385/33 |
| 6,952,310 B1 * | 10/2005 | Miyatake et al. | 359/492 |
| 6,953,252 B2 * | 10/2005 | Way | 353/99 |
| 6,986,591 B2 * | 1/2006 | Pate | 362/296 |
| 2003/0169979 A1 | 9/2003 | Fujita et al. | 385/89 |
| 2003/0231843 A1 | 12/2003 | Colombo et al. | 385/115 |

\* cited by examiner

*Primary Examiner*—Sung Pak
*Assistant Examiner*—Tina M. Wong
(74) *Attorney, Agent, or Firm*—Eugene I. Shkurko, Esq.; Kevin P. Radigan, Esq.; Heslin Rothenberg Farley & Mesiti, P.C.

(57) ABSTRACT

A light transmission device is provided including a light pipe having two ends, one end being an ellipsoidal-shaped end. A recess is configured within the ellipsoidal-shaped end for reception of a light source that transmits light into the light pipe. The recess includes an interior concave wall, and the light source is at least partially received in the recess to face the interior concave wall via which light is transmitted into the light pipe. The ellipsoidal-shaped end further includes a curved surface configured to facilitate collection of light into the light pipe when the light source is at least partially received in the recess in the ellipsoidal-shaped end. The ellipsoidal-shaped end includes a first focal point and a second focal point, wherein the recess in the ellipsoidal-shaped end intersects the first focal point, and the second focal point is disposed adjacent to or within the light pipe.

20 Claims, 5 Drawing Sheets

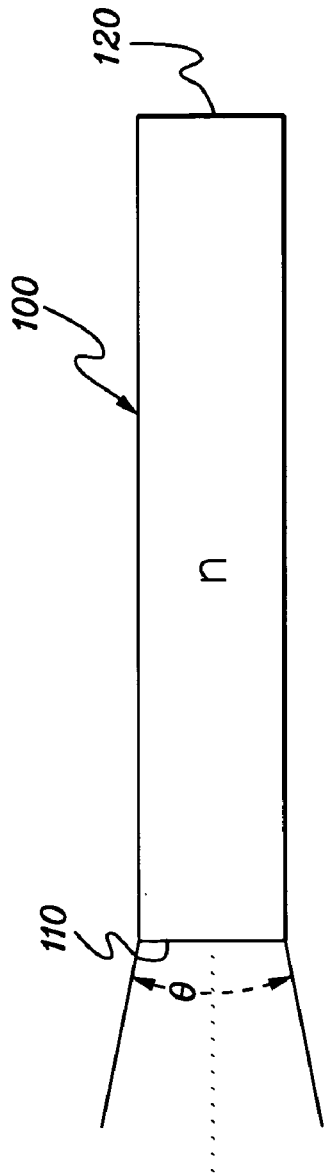
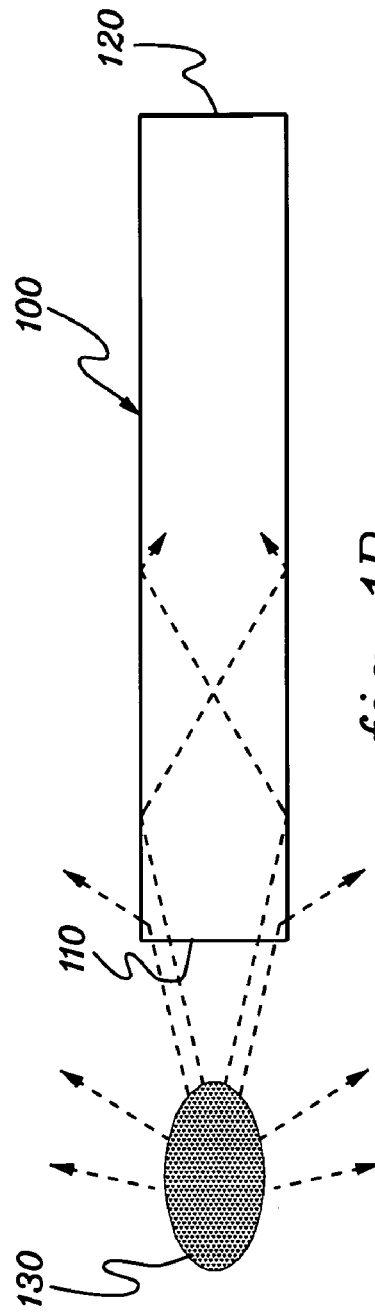
fig. 1A
(PRIOR ART)
fig. 1B
(PRIOR ART)

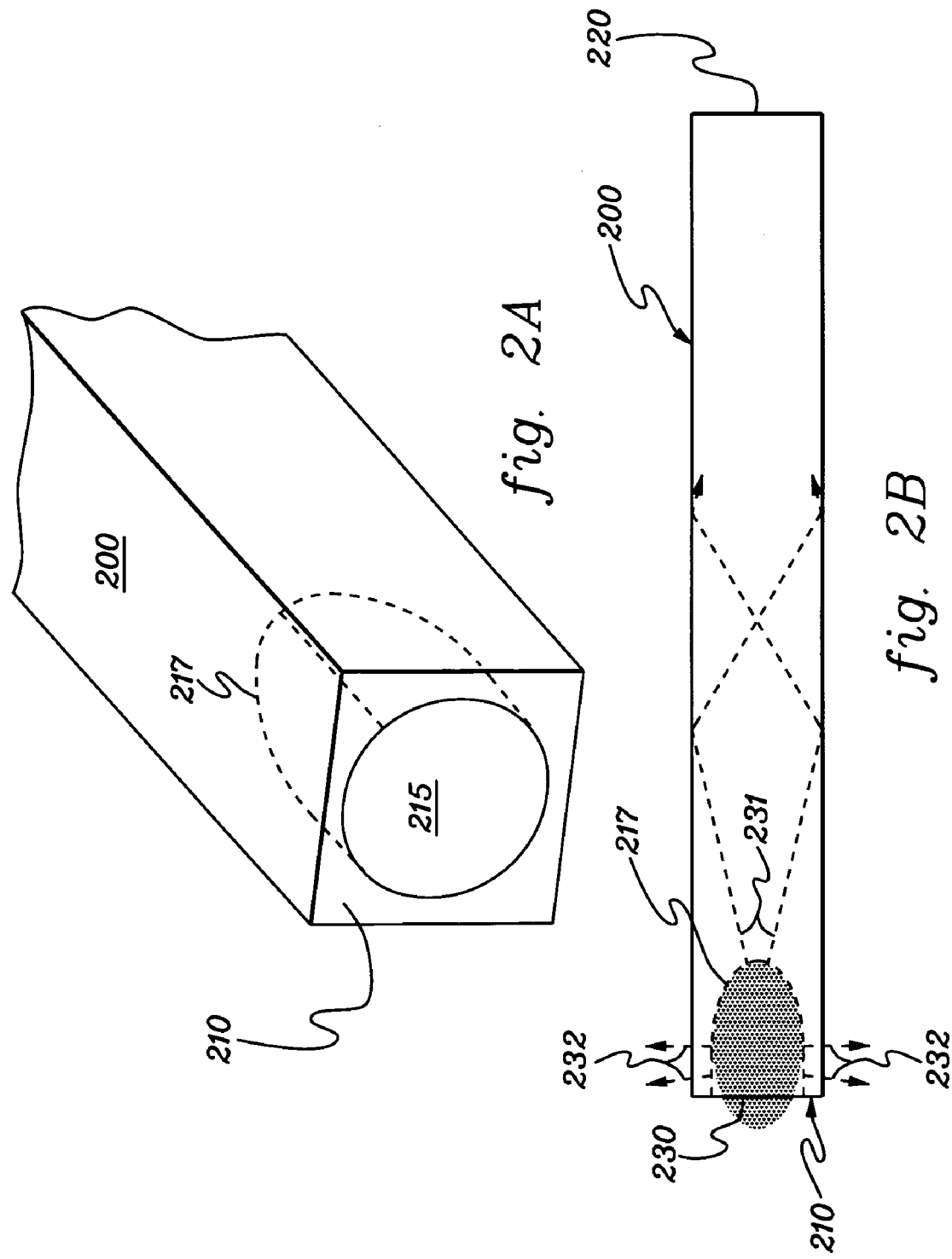

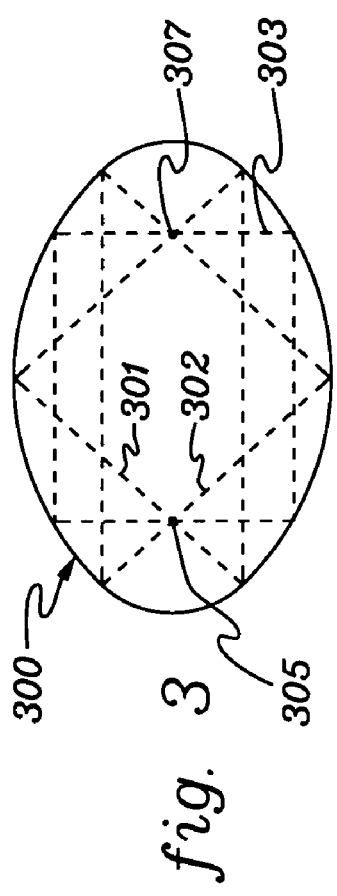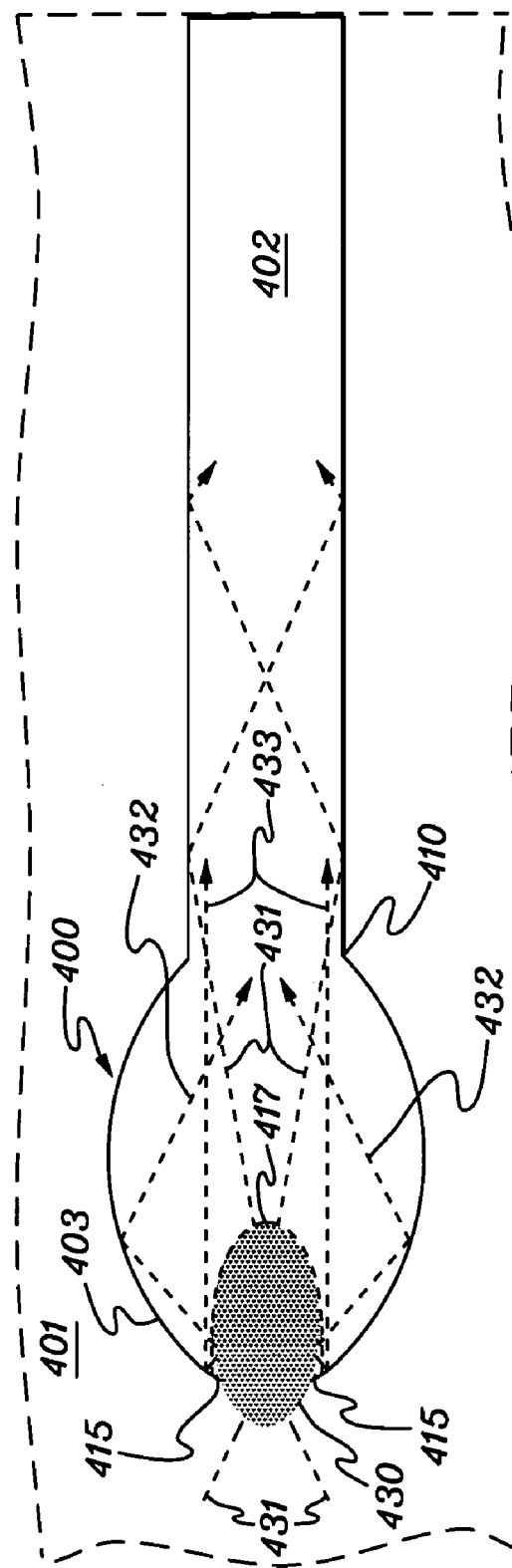

US 7,215,863 B1

LIGHT PIPE OPTICAL COUPLING UTILIZING CONVEX-SHAPED LIGHT PIPE END

TECHNICAL FIELD

This invention relates generally to light transmission devices and methods, and more particularly, to enhanced optical coupling of light sources to light pipes employing a convex-shaped light pipe end.

BACKGROUND OF THE INVENTION

Light pipe technology is a robust and inexpensive method for bringing light to the exterior of products for the purposes of communicating device status, or other important information to a user. Generally, a light pipe is used in situations where physical restrictions (e.g., lack of space, high component density), safety concerns (such as component accessibility to the end user, fragile bulbs, heat buildup), or other factors prevent the light-emitting component from being mounted in a way that provides direct visibility. Light pipes are often rendered as round-cross-section or rectangular-cross-section clear plastic structures, where the objective end is placed flush with, or close to, the light-emitting component. The viewed end is brought to the exterior of a product for viewing by an end user, and is often "frosted" or diffused to increase visibility.

Certain applications require a light pipe to be used where the light-emitting component is relatively far from the exterior of the product. In such cases, the length of a traditional light pipe might reduce by attenuation the amount of visible light available at the outside of the product to such an extent that the light signal essentially becomes non-existent. One existing solution for long-run light pipes (e.g., greater than five inches) is to utilize fiber optic or other glass-based technology. These solutions are expensive, however, due to the fragility and difficulty of handling glass or other crystalline materials. Another option is to use a step index or gradient index light pipe to maintain the light within the pipe over a relatively long distance. However, this solution also results in significantly increased costs.

Thus, a need remains in the art for further improvements to enhancing optical coupling between a light-emitting component and a relatively inexpensive light pipe.

SUMMARY OF THE INVENTION

The shortcomings of the prior art are overcome and additional advantages are provided through the provision of a light transmission device including a light pipe having two ends, one of which includes a convex-shape. The convex-shaped end further includes a recess configured for reception of a light-emitting component for transmission of light into the light pipe. The recess has an interior concave wall, with the light-emitting component to be at least partially received in the recess to face the interior concave wall via which light is transmitted into the light pipe. The convex-shaped end further includes a curved surface configured to facilitate collection of light into the light pipe when the light-emitting component is at least partially received in the recess in the convex-shaped end.

In another aspect, a light device is provided which includes a light source, and a light pipe having two ends. One end of the light pipe is a convex-shaped end with the light source being at least partially disposed within a recess therein. The convex-shaped end includes a curved surface configured to facilitate collection of light into the light pipe from the light source.

In a further aspect, a method of coupling light from a light source on an electronics board to an edge of the electronics board is provided. The method includes: providing a light transmission device comprising a light pipe having two ends, one end being a convex-shaped end, the convex-shaped end including a curved surface configured to facilitate focusing of light into the light pipe, wherein the convex-shaped end further includes a recess configured to receive at least a portion of the light source; and positioning the light transmission device on the electronics board with the light source at least partially received within the recess in the convex-shaped end of the light pipe, and an opposite end of the light pipe disposed near an edge of the electronics board.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1A is an elevational view of one embodiment of a conventional light pipe useful in defining numerical aperture;

FIG. 1B is an elevational view of one embodiment of the conventional light pipe of FIG. 1A, shown with light being coupled into one end thereof from a light-emitting component;

FIG. 2A is a partial perspective view of one embodiment of a light pipe having a bullet-shaped recess in one end thereof to facilitate partial insertion of a light-emitting component into the one end of the light pipe, in accordance with an aspect of the present invention;

FIG. 2B is an elevational view of the light pipe of FIG. 2A, shown with a light-emitting component disposed within the recess in the one end thereof, thereby facilitating capturing of light emitted from the light-emitting component into the light pipe, in accordance with an aspect of the present invention;

FIG. 3 is an elevational view of one embodiment of an ellipsoidal-shaped structure to be at least partially defined at one end of a light pipe, in accordance with an aspect of the present invention;

FIG. 4 is an elevational view of one embodiment of a light transmission device including a light pipe with an ellipsoidal-shaped extension disposed at one end thereof, and a recess formed in the ellipsoidal-shaped extension for receiving the light-emitting component, in accordance with an aspect of the present invention;

BEST MODE FOR CARRYING OUT THE INVENTION

Figure 5A:
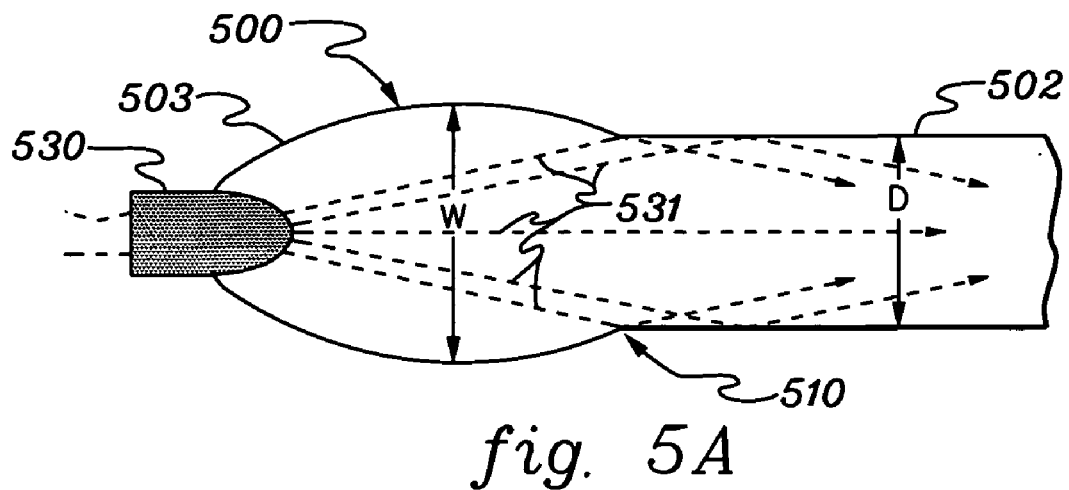
FIG. 5A is a partial elevational view of one embodiment of a light transmission device having an ellipsoidal-shaped extension at one end of the light pipe, and a light-emitting component disposed within a recess formed within the ellipsoidal-shaped extension, and showing direct projection of light rays from an end of the light source into the light pipe, in accordance with an aspect of the present invention.

Generally stated, presented herein are various light transmission devices wherein a convex-shaped surface or extension is provided at the objective end of a light pipe, with a concave recess therein for at least partially accommodating a light source to facilitate capture of light into the light pipe, and thereby allow operation of the light transmission device over a longer distance than previously realizable. As used herein, the terms "light source" and "light-emitting component" are used interchangeably to refer to any light source structure. By way of example, the light source may be a light-emitting diode (LED) on an electronics board, such as a circuit card or printed circuit board. The convex-shaped extension is, in one embodiment, fabricated of a common material as the light pipe (e.g., a plastic) to have a common index of refraction. Further, the convex-shaped extension may be integrally molded with the light pipe.

FIGS. 1A & 1B depict a conventional light pipe 100 having a first or objective end 110 and a second or viewed end 120. As shown in FIG. 1A, angle "θ" is the angle that light is launched into light pipe 100, while the constant "n" refers to the refractive index of the light pipe. Normally, a standard light source 130, such as a light-emitting diode, is placed in close proximity to end 110 of light pipe 100. Only the emitted light rays directed towards the light pipe within the capture angle "θ" are captured into the light pipe and transmitted for viewing at second end 120.

The amount of light captured depends on the numerical aperture of the light pipe (at the intended optical wavelength), which is a function of the refractive index of the light pipe material and the critical angle for light rays entering the pipe. More particularly, the numerical aperture equals n sin (θ). The critical angle can be minimized by placing the pipe as close as possible to the light source. However, as noted, attenuation of plastic light pipes can be very high, and recent electronic board designs have required much longer light pipes than used previously due to the use of more components placed in closer proximity to each other on the board. Conventional light pipes can transmit visible wavelengths over several inches without difficulty; however, when the light pipe length becomes much longer, light transmission efficiency of the light pipe is diminished. Recent designs under development will require light pipes on the order of nine to twelve inches or longer. At these distances, there is often not enough light coupled into the pipe to produce a visible display at the other end. Increasing the brightness of the light source is not an option due to other design constraints. For example, high drive currents degrade the light source lifetime and cause premature failure. There are also limitations on the maximum drive current and brightness for many commercial light sources, which do not support operation of long light pipes. Special high brightness light sources are available for military and aerospace applications, but are too expensive for use in most computer systems, and consume more energy and generate more heat than desirable for most computer systems. Likewise, lower loss glass light pipes are available, but as noted above, are very expensive and tend to be fragile, subject to microcracks, and have lower reliability than plastic light pipes.

A first potential solution to the problem is illustrated in FIGS. 2A & 2B. As shown, light pipe 200 includes a first or objective end 210 and a second or viewed end 220. A recess 215 is defined in first end 210 with a shape similar to a light source 230 to be received into the recess 215. As shown, recess 215 includes an inner concave wall 217 through which light 231 from light source 230 passes into light pipe 200. By molding end 210 of light pipe 200 with recess 215 to conform around light source 230, it is possible to capture a greater amount of light from the light source. One advantage of this approach is its simplicity of manufacturing. A properly sized aperture for the light source can be easily molded into a plastic light pipe during its fabrication process for little additional cost. Recess 215 can be formed in any desired shape, including bullet-shaped or rectangular-shaped. One problem with the design, however, is that light 232 emitted from the sides of light source 230 may still be lost due to a high angle of incidence at the surface of light pipe 200. One solution to this loss would be to fabricate recess 215 within an elliptical shape. However, forming an elliptical-shaped recess adds complication to the fabrication process.

As a further enhancement, the objective end of the light pipe can be provided as a convex-shaped end, such as an ellipsoidal-shaped end. FIG. 3 depicts an elevational view of an ellipsoidal-shaped structure 300 wherein multiple light rays 301, 302, 303 are reflected between a first focal point 305 and a second focal point 307. This figure illustrates the "whispering gallery" effect of light rays propagating within an elliptical structure; that is, an elliptical surface reflects light from one focal point to a conjugate focal point.

In accordance with an aspect of the present invention, this principle is employed in a light transmission device 400 such as depicted in FIG. 4. Light transmission device 400, which is shown positioned on an electronics board 401, includes a light pipe 402 having a first end 410 and a second end 420. As shown, second end 420 is roughly aligned with an edge of electronics board 401. First end 410 of light pipe 402 is a convex-shaped end of the light transmission device and, in this embodiment, comprises an at least partially ellipsoidal-shaped extension 403 formed integral with light pipe 402. As used herein, the phrase "ellipsoidal-shaped" refers to an at least partially ellipsoidal-shaped end or extension. More broadly, "convex-shaped end" is used to refer to the curved outer surface at the objective end of the light pipe.

By way of example, ellipsoidal-shaped extension 403 can be integrally molded with light pipe 402. A recess 415 is defined within ellipsoidal-shaped extension 403 to at least partially accommodate light source 430 therein. Recess 415 is defined by an interior concave surface 417 through which light propagates from light source 430 into ellipsoidal-shaped extension 403 when light source 430 is positioned within recess 415 as shown. As one example, light source 430 is a light-emitting diode (LED) powered through electrical connections 431.

As shown in FIG. 4, light rays can enter light pipe 402 from light source 430 in a number of ways. First, light rays 431 within the numerical aperture of light pipe 402 enter directly as shown, while light rays 432 are focused into the light pipe by the "whispering gallery" effect of the ellipsoidal-shaped extension 403, and backscattered light rays 433 are collimated by the ellipsoidal-shaped extension and enter light pipe 402 as collimated light. The capture mechanism for each of these light ray types is separately discussed below with reference to FIGS. 5A–5C.

As shown in FIG. 5A, a light transmission device 500 again includes a light pipe 502 having an ellipsoidal-shaped extension 503 at a first end 510 thereof. In this example, the width W of the ellipsoidal-shaped extension 503 is shown closer to the diameter D of the light pipe 502 transverse to the longitudinal axis thereof. A recess is again provided within the ellipsoidal-shaped extension 503 to accommodate a light source 530, such as a light-emitting diode. Light rays projecting from light source 530 within the numerical aperture of light pipe 502 pass directly into the light pipe where they propagate via internal reflection off the surface of the light pipe 502 due to the change in refractive index between the light pipe and the surrounding air. It is assumed that the light pipe is a single monolithic plastic pipe of any desired geometry, for example, a rectangular-shaped pipe or a cylindrical-shaped pipe.

FIG. 5B again depicts the light transmission device 500 of FIG. 5A, and illustrates the focusing of light rays 532 from the light source 530 by ellipsoidal-shaped extension 503 into light pipe 502. This example assumes that the light source intersects a first focal point 540 and that the second focal point 542 is disposed within light pipe 502. The actual positioning of second focal point 542 can vary as desired, but is preferably disposed adjacent to or within the confines of the light pipe 502. Those skilled in the art will understand that actual positioning of the focal points is determined by the curvature of the ellipse. As shown, forward scattered light rays 532 reflect off the surface of the ellipsoidal-shaped extension 503 and are focused to the second focal point 542, which acts as a virtual light source within light pipe 502.

Figure 5B:
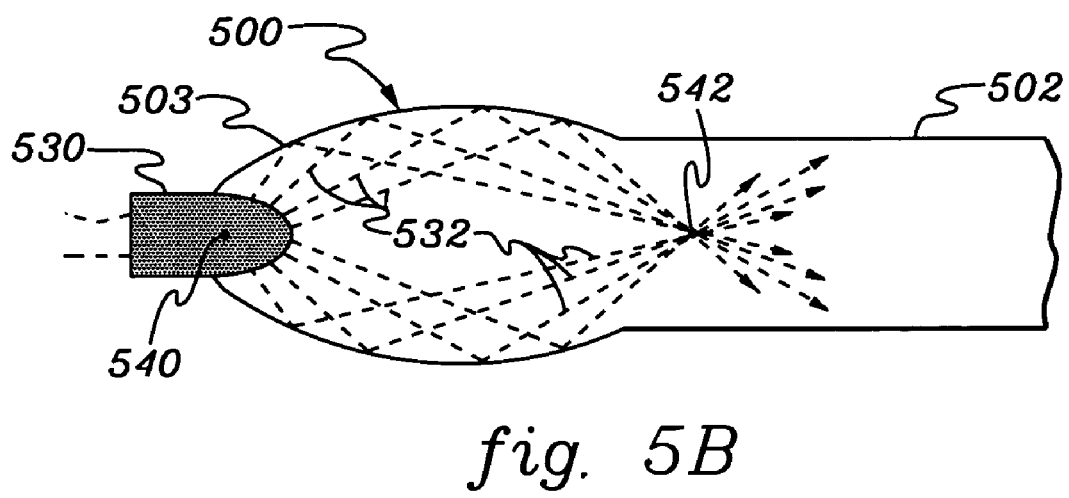
FIG. 5B is a partial elevational view of the light transmission device of FIG. 5A, showing focusing of light rays from an outer curved surface of the ellipsoidal-shaped extension to a second focal point of the ellipsoidal-shaped extension within the light pipe, in accordance with an aspect of the present invention.
Figure 5C:
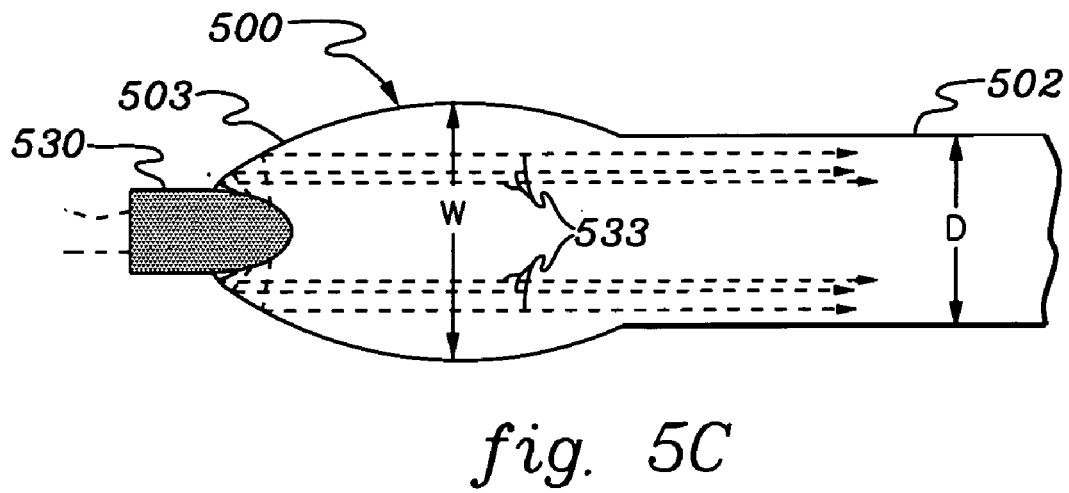
FIG. 5C is a partial elevational view of the light transmission device of FIGS. 5A & 5B, illustrating collimation of backscattered light from the light source by the curved surface of the ellipsoidal-shaped extension, and transmission of the collimated light directly into the light pipe, in accordance with an aspect of the present invention.

FIG. 5C depicts the light transmission device 500 of FIGS. 5A & 5B, and illustrates the collimation of backscattered light 533 from light source 530. As shown, backscattered light reflects off the curved surface of the ellipsoidal-shaped extension 503 to become collimated and hence project directly into light pipe 502. Note that this collection of backscattered light 533 assumes that the diameter D of light pipe 502 is sufficiently large relative to the width W of the ellipsoidal-shaped extension 503 to allow the collimated light to directly pass into the light pipe.

Figure 6A:
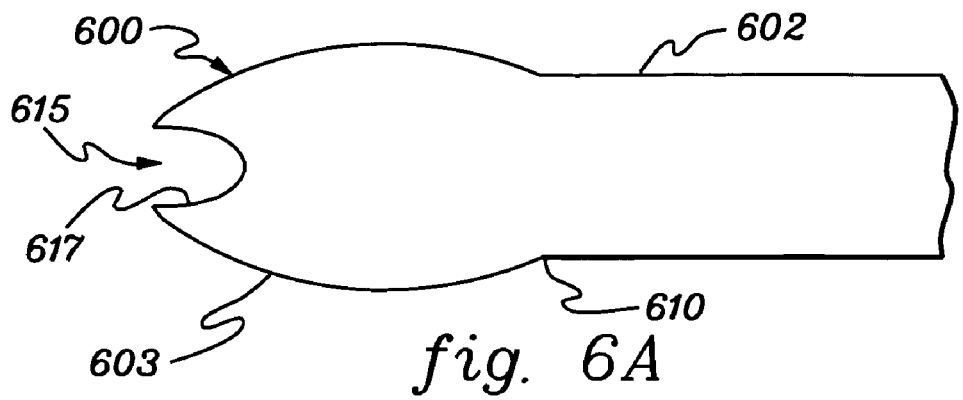
FIG. 6A is a partial elevational view of a light transmission device having an ellipsoidal-shaped extension at one end of the light pipe, and a bullet-shaped recess disposed within the ellipsoidal-shaped extension, in accordance with an aspect of the present invention.
Figure 6B:
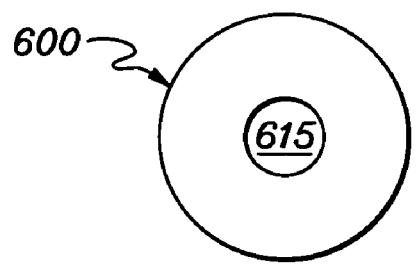
FIG. 6B is an end elevational view of the structure of FIG. 6A, showing the circular cross-sectioned, bullet-shaped recess formed in the ellipsoidal-shaped extension, in accordance with an aspect of the present invention.

FIGS. 6A & 6B depict an alternate embodiment of a light transmission device 600 in accordance with an aspect of the present invention. As with the above-described embodiments, device 600 includes a light pipe 602 having an ellipsoidal-shaped extension 603 at a first end 610 thereof. A light source accommodating recess 615 is formed within ellipsoidal-shaped extension 603, preferably intersecting a first focal point thereof. Recess 615 is shown to have a bullet shape in this embodiment for accommodating a bullet-shaped light-emitting component (not shown). The inner concave wall 617 of recess 615 can be molded or otherwise formed to closely conform to the exterior shape of the light source to be at least partially received within the recess. If desired, a refractive index matching gel or paste could be employed within recess 615 between the light source and the inner concave wall.

Figure 7A:
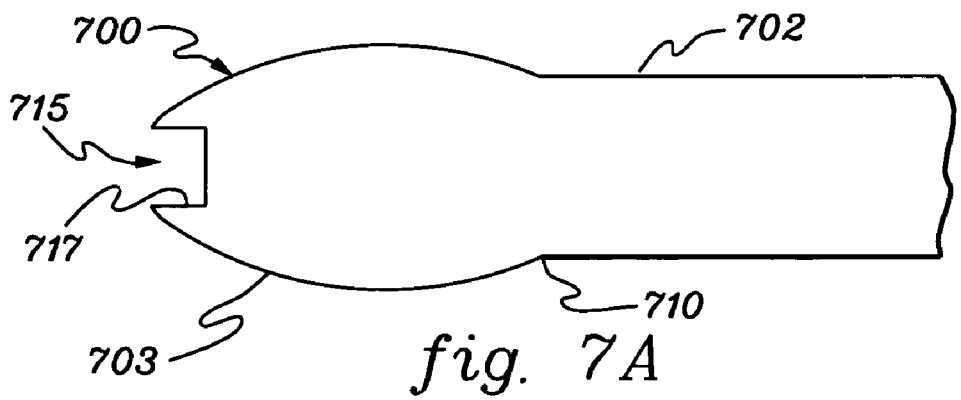
FIG. 7A is a partial elevational view of a light transmission device having an ellipsoidal-shaped extension at one end of the light pipe, and a rectangular-shaped recess formed within the ellipsoidal-shaped extension, in accordance with an aspect of the present invention.
Figure 7B:
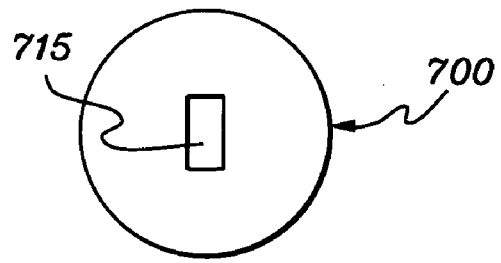
FIG. 7B is an end elevational view of the structure of FIG. 7A, showing the rectangular-shaped recess in the ellipsoidal-shaped extension, in accordance with an aspect of the present invention.

FIGS. 7A & 7B depict an alternate embodiment of a light transmission device 700 in accordance with an aspect of the present invention. These figure again depict a light pipe 702 with an ellipsoidal-shaped extension 703 at a first end 710 thereof. Extension 703 includes a recess 715 configured to accommodate a rectangular-shaped light-emitting component (not shown). In this example, recess 715 has an inner concave wall 717 defined to approximate the exterior shape of the rectangular-shaped light source to be received within the recess. The bullet-shaped recess of FIGS. 6A & 6B, and the rectangular-shaped recess of FIGS. 7A & 7B are illustrated herein by way of example only. These shapes are commonly employed by today's light-emitting diodes.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A light transmission device comprising:
    a light pipe having two ends;
    one of the ends comprising an ellipsoidal-shaped end comprising a first focal point and a second focal point and including a recess configured for reception of a light-emitting component that transmits light into the light pipe, the recess intersecting the first focal point and having an interior concave wall, with the light-emitting component to be at least partially received in the recess to face the interior concave wall via which light is transmitted into the light pipe; and
    wherein the ellipsoidal-shaped end includes a curved surface configured to facilitate collection of light into the light pipe when the light-emitting component is at least partially received in the recess to face the interior concave call, and intersecting the first focal point.

2. The light transmission device of claim 1, wherein the light pipe comprises a longitudinal axis extending between the two ends thereof, and wherein the first focal point and the second focal point reside on the longitudinal axis.

3. The light transmission device of claim 2, wherein the light pipe comprises a longitudinally axially-extending light pipe, and the ellipsoidal-shaped end comprises an ellipsoidal-shaped extension at the one end of the longitudinally axially-extending light pipe.

4. The light transmission device of claim 3, wherein the longitudinally axially-extending light pipe includes a transverse diameter D, and wherein the ellipsoidal-shaped extension has an outer width W in a direction parallel to the transverse diameter D of the longitudinally axially-extending light pipe, wherein width W≧diameter D.

5. The light transmission device of claim 3, wherein the ellipsoidal-shaped end and the light pipe are integrally formed of a common material.

6. The light transmission device of claim 5, wherein the common material is a plastic.

7. The light transmission device of claim 2, wherein the first focal point and the second focal point of the ellipsoidal-shaped end are conjugate focal points, and the ellipsoidal-shaped end comprises an elliptical surface which reflects light from the first focal point to the second focal point.

8. The light transmission device of claim 7, wherein with the light-emitting component received in the recess to face the interior concave wall, the first focal point is disposed in a center region of the light-emitting component.

9. The light transmission device of claim 7, wherein the second focal point of the ellipsoidal-shaped end is disposed adjacent to the light pipe with a majority of light passing therethrough being captured into the light pipe for propagation within the light pipe.

10. The light transmission device of claim 7, wherein the second focal point of the ellipsoidal-shaped end is disposed within the light pipe with light passing therethrough propagating within the light pipe.

11. The light transmission device of claim 2, wherein the light-emitting component comprises a visible light-emitting diode (LED), and wherein the recess in the ellipsoidal-shaped end defines a perimeter surface extending about the LED.

12. The light transmission device of claim 11, wherein the light transmission device is configured to reside on an electronics board, and wherein an opposite end of the light pipe from the ellipsoidal-shaped end is disposed near an edge of the electronics board when the light transmission device resides on the electronic board.

13. A light device comprising:
a light source;
a light pipe having two ends; and
one of the ends comprising an ellipsoidal-shaped end with the light source being at least partially disposed therein, the ellipsoidal-shaped end comprising a first focal point and a second focal point and including a curved surface configured to facilitate collection of light into the light pipe from the light source, wherein the light source is disposed to intersect the first focal point.

14. The light device of claim 13, wherein the light source is at least partially disposed within a recess formed in the ellipsoidal-shaped end of the light pipe, and the second focal point is within the light pipe.

15. The light device of claim 14, wherein the ellipsoidal-shaped end and the light pipe are integrally formed of a common material.

16. The light device of claim 15, wherein the ellipsoidal-shaped end and the light pipe are formed around the light source and in physical contact with the light source.

17. The light device of claim 13, wherein the light pipe comprises a longitudinal axis extending between the two ends thereof, and wherein the first focal point and the second focal point reside on the longitudinal axis, the first focal point and the second focal point being conjugate focal points, and the ellipsoidal-shaped end comprising an elliptical surface which reflects light from the first focal point to the second focal point.

18. The light device of claim 13, wherein the light source comprises a visible light-emitting diode (LED), the ellipsoidal-shaped end surrounding the LED, and wherein the ellipsoidal-shaped end and the light pipe are integrally formed of a common plastic material.

19. A method of coupling light from a light source on an electronics board to an edge of the electronics board, the method comprising:
providing a light transmission device comprising a light pipe having two ends, one end of the two ends comprising an ellipsoidal-shaped end, the ellipsoidal-shaped end including a first focal point and a second focal point, and including a curved surface configured to facilitate focusing of light into the light pipe, and wherein the ellipsoidal-shaped end further includes a recess configured to receive at least a portion of the light source, the recess intersecting the first focal point; and
positioning the light transmission device on the electronics board with the light source at least partially received within the recess in the ellipsoidal-shaped end of the light pipe to intersect the first focal point, and an opposite end of the light pipe disposed near an edge of the electronics board, wherein the second focal point is disposed within the light pipe with light passing therethrough continuing to propagate within the light pipe.

20. The method of claim 19, wherein the light pipe comprises a longitudinal axis extending between the two ends thereof, and wherein the first focal point and the second focal point reside on the longitudinal axis, the first focal point and the second focal point being conjugate focal points, and wherein the ellipsoidal-shaped end comprises an elliptical surface which reflects light from the first focal point to the second focal point.

* * * * *